United States Patent [19]

Schoenberg

[11] 4,139,693
[45] Feb. 13, 1979

[54] 2-CYANOACRYLATE ADHESIVE COMPOSITIONS HAVING ENHANCED BOND STRENGTH

[75] Inventor: Jules E. Schoenberg, Scotch Plains, N.J.

[73] Assignee: National Starch and Chemical Corporation, Bridgewater, N.J.

[21] Appl. No.: 891,375

[22] Filed: Mar. 29, 1978

[51] Int. Cl.$^2$ .................................. C08F 120/34
[52] U.S. Cl. .................................. 526/297; 428/442; 428/463; 428/522; 526/210
[58] Field of Search .......................... 526/210, 297

[56] References Cited

U.S. PATENT DOCUMENTS

| | | | |
|---|---|---|---|
| 2,776,232 | 1/1957 | Shearer et al. | 526/297 |
| 2,912,454 | 11/1959 | McKeever | 260/465.4 |
| 2,926,188 | 2/1960 | McKeever | 260/465.4 |
| 3,527,224 | 9/1970 | Rabinowitz | 526/297 |
| 3,564,078 | 2/1971 | Wicker et al. | 526/297 |
| 3,652,635 | 3/1972 | Kawamura et al. | 526/297 |
| 3,692,752 | 9/1972 | Setsuda et al. | 526/297 |
| 3,832,334 | 8/1974 | O'Sullivan et al. | 526/297 |
| 3,836,377 | 9/1974 | Delahunty | 526/297 |
| 3,940,362 | 2/1976 | Overhults | 526/210 |
| 3,948,794 | 4/1976 | Konig | 252/182 |

*Primary Examiner*—Harry Wong, Jr.
*Attorney, Agent, or Firm*—Edwin Szala; Janet E. Hasak

[57] ABSTRACT

Adhesive compositions having enhanced bond strength are obtained by mixing a monomeric ester of 2-cyanoacrylic acid with an anionic polymerization inhibitor and from 1 to 30 mmoles per kg. of adhesive of an adhesion promoter of the formula:

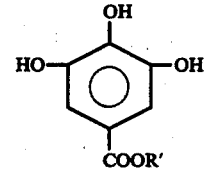

wherein R' is hydrogen or an alkyl, aryl or cycloalkyl group having 1–10 carbon atoms. Such compositions may be used on a wide variety of substrates and are particularly useful on metals.

10 Claims, No Drawings

2-CYANOACRYLATE ADHESIVE COMPOSITIONS HAVING ENHANCED BOND STRENGTH

BACKGROUND OF THE INVENTION

1. Field of the Invention

This invention relates to improved 2-cyanoacrylate adhesive compositions. More particularly, this invention is directed to 2-cyanoacrylate adhesive compositions containing an adhesion promoter which compositions have enhanced bond strength.

2. Description of the Prior Art

Adhesive compositions based on 2-cyanoacrylate esters belong to a class of adhesives known as reactive liquid adhesives. 2-Cyanoacrylate adhesives are single-part, low-viscosity adhesives which are characterized by features such as (1) their ability to polymerize at room temperature without the use of an added catalyst when pressed between two substrates, (2) their rapid rate of cure, and (3) the strength of the bonds produced with a wide variety of substrates. Conventional adhesives, on the other hand, cure, for example, upon application of heat and pressure, addition of catalyst, or evaporation of a solvent. A general review of 2-cyanoacrylate adhesives can be found in I. Skeist's "Handbook of Adhesives", New York: Reinhold Publishing Corporation, 1962, Chapter 31, p. 409–414.

Application of the 2-cyanoacrylate adhesive merely involves spreading a small sample thereof in a thin film between two substrates, pressing the substrates together, and allowing the resultant bond to cure. The adhesive develops sufficient strength after a short period of time to hold the substrates together until the adhesive completely polymerizes and builds up to its maximum bonding strength.

Initiation of polymerization (cure) is generally believed to proceed through an anionic mechanism; the 2-cyanoacrylate adhesives have such a great tendency to polymerize that water itself is a sufficiently active initiator. Hence, when the adhesive is applied to a substrate and thereby exposed to atmospheric and surface moisture, cure normally begins within a relatively short period of time, generally less than one minute, and on many surfaces within a matter of a few seconds. The rapid cure rate of the 2-cyanoacrylate adhesives is particularly advantageous in production line applications.

Due to their tendency to polymerize, 2-cyanoacrylate adhesive compositions normally contain one or more stabilizers. To prevent anionic polymerization, an inhibitor such as an acidic gas or a protonic acid is normally added to the composition. In general, as the acidity of these inhibitors increases, the stability of the adhesive is enhanced while, at the same time, the cure rate is reduced. It is sometimes desirable to further add an inhibitor of free radical polymerization to the monomer. This latter type of inhibitor is generally a phenolic type compound such as, for example, hydroquinone, t-butyl catechol, pyrocatechol, p-methoxyphenol, and pyrogallol. Typical patents describing use of these and other compounds as stabilizers for 2-cyanoacrylate adhesive compounds include U.S. Pat. Nos. 2,765,332; 2,912,454; 2,926,188; and 3,993,678; as well as Japanese Patent Publication No. 49-31619.

Although adhesive compositions consisting of 2-cyanoacrylate esters and conventional stabilizers inherently yield high bond strength (as commonly measured by the test of tensile shear strength), improvements therein would be desirable particularly in cases where the substrate is of greater strength than the adhesive, as in the case of many metal bonds. While many stabilizers for 2-cyanoacrylate adhesive compositions have been investigated in the prior art, relatively little research has been done on adhesion promoters which enhance the bond strength of the adhesive without lessening the stability or cure rate thereof. In this regard, selected carboxylic acid anhydrides have been used in the prior art as adhesion promoters for 2-cyanoacrylate adhesive compositions. Thus, U.S. Pat. No. 3,832,334 teaches the use of maleic anhydride to increase the bond strength of a 2-cyanoacrylate adhesive at elevated temperatures, while U.S. Pat. No. 3,948,794 teaches the use of itaconic anhydride to improve not only the stability of the 2-cyanoacrylate adhesive composition but also the tensile shear strength and other properties associated therewith.

It has been disclosed in German Offenlegungsschrift 26 12 546 that a wide variety of carboxylic acids, generally known to stabilize 2-cyanoacrylate adhesives to varying degrees, exert a definite effect on the bond strength of certain 2-cyanoacrylate adhesive compositions containing excess plasticizer. The plasticizer is added in amounts of 20-60% by weight, based on the total composition, to make the adhesive bonds readily releasable. It is suggested that one of the functions of the carboxylic acid therein is to counteract the weakening effect of the plasticizer on the bond strength of the adhesive. Nevertheless, the large number of carboxylic acids described as being applicable in the German publication limits the use of the adhesive composition to very few types of substrates. For example, many of the carboxylic acids listed therein, i.e., those with a high acid strength, act very effectively as anionic polymerization inhibitors and hence will significantly retard the rate of cure of the adhesive, particularly on non-polar substrates, within the concentration range given therein. Yet, as described hereinabove, the rapid rate of cure is one of the main characterizing features of 2-cyanoacrylate adhesives in general. Furthermore, it has been demonstrated that at least some of the weaker acids within the scope of the German publication, which acids do not significantly reduce the rate of cure of the adhesive composition, have in fact very minimal effect on the bond strength of the composition on many metals.

Accordingly, it is an object of the present invention to provide an improved 2-cyanoacrylate adhesive composition having enhanced bond strength.

It is another object to provide an adhesion promoter for 2-cyanoacrylate adhesive compositions which does not significantly retard the cure rate thereof.

It is a further object to provide a process for improving the adhesive properties of a stabilized 2-cyanoacrylate adhesive composition.

SUMMARY OF THE INVENTION

The above and related objects are achieved in preparing an improved adhesive composition comprising a mixture of:

(A) a monomeric ester of 2-cyanoacrylic acid of the general formula:

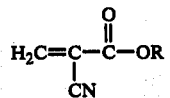

wherein R is an alkyl or alkenyl group having from 1 to 16 carbon atoms, a cyclohexyl group or a phenyl group;

(B) an anionic polymerization inhibitor; and (C) form 1 to 30 mmoles per kg. of adhesive of an adhesion promoter of the general formula:

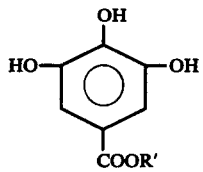

wherein R' is hydrogen or an alkyl, aryl or cycloalkyl group having from 1 to 10 carbon atoms.

The process for preparing the improved adhesive composition of this invention comprises the step of dissolving into the stabilized 2-cyanoacrylate adhesive from 1 to 30 mmoles per kg. of adhesive of the adhesion promoter defined above.

The preferred 2-cyanoacrylate esters herein are those wherein the R group is an alkyl or alkenyl group having 1 to 4 carbon atoms, with the ethyl ester being particularly preferred. The anionic polymerization inhibitor which is most preferred is sulfur dioxide. The preferred group of adhesion promoters for use herein are those wherein R' is an alkyl, aryl or cycloalkyl group of 1-10 carbon atoms, and most preferably an alkyl group having 1-6 carbon atoms.

If the adhesive composition is to be stored for an extended period of time, it may be desirable to add a free radical polymerization inhibitor to the composition of this invention to impart added storage stability. Other optional ingredients which improve specific properties of the adhesive such as thickeners or plasticizers also may be incorporated into the composition, if desired.

The adhesion promoter herein serves to enhance the bond strength of the adhesive composition when applied to many substrates which are stronger than the adhesive bond, such as most metal substrates. It is necessary that the adhesion promoter be present in the composition within a specified concentration range, and only the narrow range prescribed herein is effective in obtaining the high bond strengths characteristic of this invention. To maximize bond strength while minimizing retardation in cure rate, the adhesion promoter is preferably employed in amounts ranging from 1 to 10 mmoles/kg. of total adhesive composition.

DESCRIPTION OF THE PREFERRED EMBODIMENTS

The adhesive composition of the present invention is based on a monomeric ester or mixture of esters of 2-cyanoacrylic acid as described hereinabove. For purposes of this invention, the preferred esters are those wherein the R group is an alkyl or alkenyl group having 1 to 4 carbon atoms, and, more particularly, a methyl, ethyl, allyl, or iso-or n-butyl group. An especially preferred ester for preparing the adhesives of this invention is ethyl 2-cyanoacrylate due to its commercial availability.

The above-mentioned monomeric esters of 2-cyanoacrylic acid may be prepared by methods well known in the art such as those described in U.S. Pat. Nos. 2,467,926; 2,467,927; and 3,254,111; the disclosures of which are incorporated herein by reference.

The 2-cyanoacrylate esters herein are stabilized by adding one or more anionic polymerization inhibitors thereto. A wide variety of anionic polymerization inhibitors known in the art to stabilize 2-cyanoacrylate adhesive compositions such as acidic gases and protonic acids or anhydrides thereof is applicable herein. Examples of suitable acidic gases for this purpose include sulfur dioxide, nitric oxide, carbon dioxide, hydrogen fluoride, and the like. Suitable protonic acids include mineral acids such as hydrochloric, sulfuric or carboxylic acids. Examples of anhydrides which may be employed as anionic polymerization inhibitors include carboxylic acid anhydrides, phosphoric acid anhydrides such as phosphorus pentoxide, sultones, acid chlorides, and the like. It is to be recognized that this invention is not limited to any particular anionic polymerization inhibitor since adding such an inhibitor to 2-cyanoacrylate adhesives is well known in the art. It is also to be noted that the particular anionic polymerization inhibitor used depends on the 2-cyanoacrylate ester employed. Thus, the lower ($C_1$ - $C_3$) alkyl 2-cyanoacrylate esters require a relatively acidic inhibitor such as sulfur dioxide or p-toluenesulfonic acid, while the butyl and higher esters of 2-cyanoacrylic acid generally require weaker acids such as carbon dioxide. The preferred polymerization inhibitor herein is sulfur dioxide.

Those anionic polymerization inhibitors which are in the gaseous form act not only to lengthen the shelf life of the adhesive but also are used as process stabilizers. Hence, throughout several stages in the synthesis of the 2-cyanoacrylate ester, the gaseous inhibitor, such as, for example, sulfur dioxide, is passed through the system. The high concentration of inhibitor which is thus built up is removed by pulling vacuum on the ester upon completion of the synthesis procedure. This process of stabilizing the adhesive during synthesis is known and is typically described in U.S. Pat. No. 2,756,251.

The amount of anionic polymerization inhibitor employed generally ranges from 0.001 to 0.05% by weight, based on the total adhesive composition; however, because the amount of stabilizer depends on many factors, it may be required in certain instances to use amounts outside of this range. Furthermore, it may not always be necessary to add an anionic polymerization inhibitor if the 2-cyanoacrylate ester used in the composition is commercially obtained because the commercially produced esters in some cases already contain an effective amount of inhibitor for stabilization purposes.

In accordance with the invention herein, the adhesive properties of the 2-cyanoacrylate adhesive composition stabilized with anionic polymerization inhibitor are improved by the addition of an adhesion promoter of the general formula:

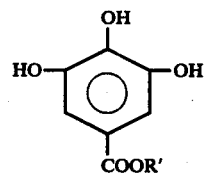

wherein R' is hydrogen or an alkyl, aryl or cycloalkyl group having 1 to 10 carbon atoms. The formal name given to this class of compounds is 3,4,5-trihydroxybenzoic acid or esters thereof, while the common name is gallic acid or esters thereof. The adhesion-promoting ability of gallic acid and its esters is observed when many substrates which are stronger than the adhesive bond, such as most metals, are bonded. In addition to metals, other substrates generally known to be bondable by means of 2-cyanoacrylate adhesives, such substrates including, for example, rubber, most plastics, phenolic resins, glass, and the like, may also be bonded using the adhesive composition of this invention. However, for certain of these substrates wherein the adhesive bond is stronger than the substrate itself, enhancement of the bond strength will not be observed.

Gallic acid, as well as certain of its esters such as propyl gallate, can be obtained commercially. The esters can be readily prepared by known esterification methods. The preferred adhesion promoters herein are the gallic acid esters because gallic acid itself is relatively acidic and has limited solubility in the 2-cyanoacrylate esters. Particularly preferred for use herein are those esters wherein R' in the above formula is an alkyl group having 1-6 carbon atoms.

The amount of adhesion promoter to be used depends on the surface to which the composition is applied, the solubility of the adhesion promoter in the particular 2-cyanoacrylate ester employed, and the amount of inhibition incurred by the promoter at higher concentrations thereof. Generally, the amount which results in optimal bond strength values with minimal retardation in cure rate on non-polar surfaces ranges from 1 to 30 mmoles per kg. of adhesive. Below 1 mmole, there is no significant improvement in the adhesion, while at concentrations above 30 mmoles, the cure rate is retarded significantly while bond strength is lessened relative to the control. The preferred amount to be employed herein is about 1-10 mmoles/kg. of adhesion promoter because at this lower concentration very little retardation in the cure rate occurs. It is to be noted that the maximum amount of adhesion promoter employed may be limited by solubility alone. For example, gallic acid and methyl gallate have limited solubilities in the less polar 2-cyanoacrylate esters (wherein R is an alkyl group having more than 3 carbon atoms).

For added storage stability it may be desirable to add a free radical polymerization inhibitor to the composition, depending on the particular 2-cyanoacrylate ester employed. For example, the addition of a powerful free radical inhibitor such as hydroquinone to an adhesive composition based on methyl 2-cyanoacrylate is highly preferred. With higher cyanoacrylate esters, however, the adhesion promoters, which are themselves weak free radical scavengers, generally provide sufficient stabilization against free radical polymerization. As a suitable inhibitor for this purpose, any one of a wide variety of inhibitors known in the art to stabilize 2-cyanoacrylate adhesive compositions against free radical polymerization is applicable. Such inhibitors include phenolic compounds such as hydroquinone, t-butyl catechol, pyrocatechol, p-methoxyphenol, and the like. The conventional free radical polymerization inhibitor, like the anionic polymerization inhibitor, is normally added during the processing of the 2-cyanoacrylate ester. Hence, a free radical polymerization inhibitor is generally introduced into the distillation vessel and the receiver to stabilize the ester in the synthesis thereof. As a result, commercially available 2-cyanoacrylate esters may already contain a certain amount of a conventional free radical polymerization inhibitor such as those mentioned hereinabove. More such inhibitor, however, may be added thereto if greater stability is desired. The total amount of such inhibitor which will be effective for stabilization purposes will range from 0.001 to 0.05% by weight of the total composition.

There may also be present in the adhesive compositions of this invention various other optional ingredients including, for example, plasticizers and thickeners. Plasticizers improve the aging characteristics of the cured bonds by lessening the brittleness thereof. For best performance the amount of plasticizer to be used should not exceed 20% by weight of the total composition. Suitable plasticizers include monofunctional and difunctional aliphatic esters of acids having 1 to 10 carbon atoms such as, for example, dimethyl-and dioctylsebacate, and esters of malonic acid, difunctional aromatic esters, and alkyl and aromatic phosphates and phosphonates. Thickeners, which may be used in amounts of up to 25% by weight, depending in part on their thickening power at room temperature, serve to increase the viscosity of the adhesive so that they may be more easily applied. Among the suitable thickeners for this purpose are included, for example, polymeric alkyl 2-cyanoacrylates, cellulose esters including cellulose acetate butyrate, acrylate resins such as poly(methyl methacrylate) and poly(ethyl methacrylate), and poly(vinyl alkyl ethers) such as poly(vinyl methyl ether).

The adhesive compositions of the present invention are generally prepared by adding a given amount of the adhesion promoter to the stabilized 2-cyanoacrylate ester and mixing at room temperature until the promoter is thoroughly dissolved in the ester. The anionic polymerization inhibitor is already present in or added to the ester before the adhesion promoter is dissolved therein. Any optional ingredients desired, including the free radical polymerization inhibitor, may be added either prior to or following the addition of adhesion promoter. The resultant adhesive composition may be used in a variety of applications, including household articles, precision instruments, optical lenses, and the like.

The following examples will demonstrate the efficacy of the 2-cyanoacrylate adhesive compositions of this invention. In these examples all percentages and parts are given by weight unless otherwise specified.

The present adhesive compositions are evaluated on the basis of the following two test procedures:

I. SET TIME TEST

One drop of test adhesive is placed near one edge of a 2.54 cm. by 2.54 cm. by 0.48 cm. phenolic chip. The mating surface of a second chip of the same dimensions is quickly placed thereover and positioned such that half of each chip overlaps the other chip. The lamination is immediately clamped together by means of a spring clip. At 15-second intervals an attempt is made to pull the two chips apart using a light peel force. The "set time" is related to the cure rate and is defined as the time interval between the initial application of the adhesive and the final time at which the chips can no longer be pulled apart manually.

II. TENSILE SHEAR STRENGTH TEST

Two metal bars of dimensions 1.27 cm. by 10.16 cm. by 0.32 cm. are used as the test materials to be bonded. Prior to use, they are treated by scouring with Scotch-Brite (Registered Trademark of 3 M Co.) scouring pads and then cleaned with acetone.

A small amount (10 microliters) of test adhesive is applied to the cleaned surface of one bar near one edge. The second bar is then pressed against the first to form an adhesive film such that there is 1.27 cm. overlap for each bar and hence a bonding area of 1.61 $cm^2$. The bars are clamped together by means of a spring clip and allowed to cure for 24 hours. The bond strength, or tensile shear strength, is determined by pulling the bars apart with an Instron Tensile Tester at a crosshead operation speed of 0.254 cm./min. The values given herein for the tensile shear strength are usually the average of five determinations and are given in units of kg./cm$^2$.

EXAMPLE I

This example illustrates the effect of the adhesion promoters of this invention on the cure rate and bond strength of 2-cyanoacrylate adhesive compositions.

Four samples of 2-cyanoacrylate adhesive compositions were prepared by adding approximately equimolar amounts of the given adhesion promoter in a quantity of ethyl 2-cyanoacrylate obtained commercially containing 0.002% sulfur dioxide and 0.001% hydroquinone as inhibitors of anionic and free radical polymerization, respectively. The gallic acid and methyl gallate used as adhesion promoters were stirred to effect solution in the 2-cyanoacrylate ester, while, with the propyl and hexyl gallates, dissolution was effected only with shaking. Each resulting composition was evaluated as to set time and tensile shear strength against a control containing no adhesion promoter. The results are summarized in Table I.

TABLE I

| Adhesion Promoter | Amount of Adhesion Promoter Added | | Set Time (sec.) | Tensile Shear Strength (kg./cm.$^2$) | | |
|---|---|---|---|---|---|---|
| | ppm | mmoles/kg. | | Steel | Brass | Aluminum |
| None (control) | 0 | 0 | 15 | 171 | 109 | 114 |
| Gallic Acid Monohydrate | 740 | 3.9 | 15 | 233 | 230 | 169 |
| Methyl Gallate | 730 | 4.0 | 15 | 220 | 220 | 167 |
| Propyl Gallate | 840 | 4.0 | 15 | 187 | 221 | 162 |
| Hexyl Gallate | 990 | 3.9 | 15 | 198 | 187 | 159 |

It can be seen from the table above that gallic acid and the esters thereof increase the bond strength of the 2-cyanoacrylate adhesive on all three types of metal substrates. Furthermore, addition of these adhesion promoters does not adversely affect the cure rate of the adhesive.

EXAMPLE II

This example illustrates the effect of the adhesion promoters of this invention on the cure rate and bond strength of butyl 2-cyanoacrylate.

Four samples of 2-cyanoacrylate adhesive composition were prepared as described in Example I except that the 2-cyanoacrylate ester was n-butyl 2-cyanoacrylate containing a small fixed amount of sulfur dioxide as anionic polymerization inhibitor. Each resulting composition was evaluated as in Example I. The results are summarized in Table II.

TABLE II

| Adhesion Promoter | Amount of Adhesion Promoter Added | | Set Time (sec.) | Tensile Shear Strength (kg./cm.$^2$) | | |
|---|---|---|---|---|---|---|
| | ppm | mmoles/kg. | | Steel | Brass | Aluminum |
| None (control) | 0 | 0 | 60 | 81 | 103 | 58 |
| Gallic Acid Monohydrate | 720 | 3.8 | 60 | 106 | 120 | 80 |
| Methyl Gallate | 700 | 3.8 | 60 | 115 | 101 | 72 |
| Propyl Gallate | 830 | 3.9 | 90* | 122 | 114 | 70 |
| Hexyl Gallate | 1020 | 4.0 | 60 | 122 | 87 | 84 |

*The higher alkyl 2-cyanoacrylate esters such as butyl 2-cyanoacrylate have much lower cure rates in general than lower alkyl 2-cyanoacrylates. Moreover, they are particularly susceptible to inhibition by acidic impurities. This higher set time was caused by such an impurity present in the propyl gallate. Purification of the propyl gallate by crystallization gave a product which had a set time comparable to that of the other adhesion promoters herein.

From the results it is clear that the adhesion promoters are very effective in butyl 2-cyanoacrylate adhesives for bonding steel and aluminum. The results obtained on brass are somewhat anomalous since the control yielded an unusually high value for the tensile shear strength on brass. In all cases, with the exception noted above for the propyl gallate containing the acidic impurity, the cure rate of the adhesive is not retarded with addition of the adhesion promoter.

EXAMPLE III

This example illustrates the effect of the adhesion promoters of this invention on the cure rate and bond strength of methyl 2-cyanoacrylate, which gives very strong bonds with metals and is thus frequently the recommended ester for bonding these types of substrates.

Four samples of 2-cyanoacrylate adhesive composition were prepared as described in Example I except that the 2-cyanoacrylate ester employed was methyl 2-cyanoacrylate containing a small fixed amount of sulfur dioxide and 0.001% hydroquinone as stabilizers. Each resulting composition was evaluated as in Example I. The results are summarized in Table III.

TABLE III

| Adhesion Promoter | Amount of Adhesion Promoter Added | | Set Time (sec.) | Tensile Shear Strength (kg./cm.$^2$) | | |
|---|---|---|---|---|---|---|
| | ppm | mmoles/kg. | | Steel | Brass | Aluminum |
| None (control) | 0 | 0 | 30 | 194 | 160 | 188 |
| Gallic Acid Monohydrate | 730 | 3.9 | 30 | 240 | 222 | 193 |
| Methyl Gallate | 750 | 4.1 | 30 | 214 | 212 | 188 |
| Propyl Gallate | 870 | 4.1 | 30 | 224 | 218 | 182 |
| Hexyl Gallate | 990 | 3.9 | 30 | 214 | 198 | 173 |

The data indicate that the adhesion promoters do not adversely affect the cure rate of the adhesive and are effective in improving the bond strength of the adhesive on steel and brass.

EXAMPLE IV

This example illustrates the effect of concentration of adhesion promoters on the bond strength of the adhesive compositions of this invention.

Eight samples of 2-cyanoacrylate adhesive compositions were prepared by dissolving the given amount of methyl gallate as adhesion promoter in ethyl 2-cyanoacrylate obtained commercially containing about 0.002% sulfur dioxide and 0.001% hydroquinone as stabilizers. The resulting compositions were evaluated against a control as to set time and tensile shear strength. The results are given in Table IV.

TABLE IV

| Concentration of Methyl Gallate (mmoles/kg.) | Set Time (sec.) | Tensile Shear Strength (kg./cm.²) | | |
| --- | --- | --- | --- | --- |
| | | Steel | Brass | Aluminum |
| 0 (control) | 15 | 102 | 86 | 84 |
| 0.8 | 15 | 133 | 112 | 101 |
| 1.6 | 15 | 138 | 117 | 99 |
| 2.7 | 15 | 143 | 115 | 111 |
| 5.4 | 15 | 144 | 136 | 105 |
| 13.6 | 30 | 148 | 137 | 98 |
| 28.2 | 45 | 138 | 115 | 103 |
| 40.2 | >60 | 123 | 112 | 79 |
| 59.2 | >60 | 75 | 59 | 58 |

The above procedure was repeated using propyl gallate instead of methyl gallate as adhesion promoter. The propyl gallate was obtained commercially and was recrystallized to remove any acid impurities before use thereof. The results are given in Table V.

TABLE V

| Concentration of Propyl Gallate (mmoles/kg.) | Set Time (sec.) | Tensile Shear Strength (kg./cm.²) | | |
| --- | --- | --- | --- | --- |
| | | Steel | Brass | Aluminum |
| 0 (control) | 15 | 122 | 86 | 99 |
| 0.6 | 15 | 113 | 81 | 96 |
| 1.2 | 15 | 136 | 112 | 122 |
| 2.4 | 15 | 136 | 106 | 122 |
| 4.7 | 15 | 183 | 115 | 130 |
| 9.4 | 30 | 153 | 128 | 123 |
| 18.9 | 30 | 167 | 165 | 128 |
| 28.3 | 45 | 150 | 131 | 103 |
| 37.7 | 60 | 111 | 94 | 72 |

The results of both tests indicate that only a certain concentration range of adhesion promoter (about 1 to 30 mmole per kg. of adhesive) is effective in promoting the bond strength of the adhesive composition. Because of the reduction in set time which occurs with increasing amounts of adhesion promoter, however, the preferred range is about 1 to 10 mmole/kg. to maintain optimum values for both the bond strength and cure rate.

Summarizing, this invention is seen to provide an improved 2-cyanoacrylate adhesive composition characterized by both enhanced bond strength and no significant reduction in cure rate by the addition of a small amount of gallic acid or selected esters thereof to a stabilized 2-cyanoacrylate adhesive composition.

Now that the preferred embodiments of the present invention have been described in detail, various modifications and improvements thereon will become readily apparent to those skilled in the art. Accordingly, the spirit and scope of the invention are to be limited only by the appended claims, and not by the foregoing specification.

What is claimed is:

1. An improved adhesive composition consisting essentially of a mixture of:
  (A) a monomeric ester of 2-cyanoacrylic acid of the general formula:

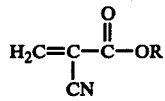

wherein R is an alkyl or alkenyl group having from 1 to 16 carbon atoms, a cyclohexyl group, or a phenyl group;
  (B) an anionic polymerization inhibitor; and
  (C) from 1 to 30 mmoles per kg. of adhesive of an adhesion promoter of the general formula:

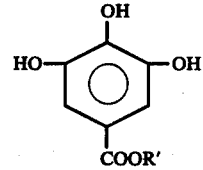

wherein R' is hydrogen or an alkyl, aryl or cycloalkyl group having from 1 to 10 carbon atoms.

2. The adhesive composition of claim 1 wherein said adhesion promoter is present in an amount of 1 to 10 mmoles per kg. of adhesive.

3. The adhesive composition of claim 1 or 2 wherein R' of said adhesion promoter is an alkyl, aryl or cycloalkyl group having from 1 to 10 carbon atoms.

4. The adhesive composition of claim 1 wherein R' of said adhesion promoter is an alkyl group having 1 to 6 carbon atoms.

5. The adhesive composition of claim 1 wherein R of said 2-cyanoacrylic acid ester is an alkyl or alkenyl group having 1 to 4 carbon atoms.

6. The adhesive composition of claim 1 wherein said anionic polymerization inhibitor is sulfur dioxide.

7. The adhesive composition of claim 1 wherein there is additionally present a free radical polymerization inhibitor.

8. The adhesive composition of claim 1 which additionally contains a thickener or plasticizer.

9. A process for improving the adhesive properties of a stabilized 2-cyanoacrylate adhesive composition which process comprises the step of dissolving into said composition from 1 to 30 mmoles per kg. of adhesive of an adhesion promoter of the general formula:

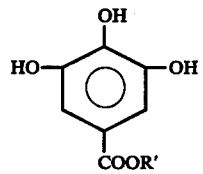

wherein R' is hydrogen or an alkyl, aryl or cycloalkyl group having from 1 to 10 carbon atoms.

10. The process of claim 9 wherein R' of said adhesion promoter is an alkyl, aryl or cycloalkyl group having from 1 to 10 carbon atoms.

* * * * *